United States Patent [19]
Johnson

[11] 3,804,367
[45] Apr. 16, 1974

[54] CONTROL LEVER AND MOUNTING MEANS THEREFOR

[75] Inventor: Howard L. Johnson, Joliet, Ill.

[73] Assignee: Caterpillar Tractor Co., Peoria, Ill.

[22] Filed: July 10, 1972

[21] Appl. No.: 270,043

[52] U.S. Cl. .............................................. 251/235
[51] Int. Cl. ............................................ F16k 31/44
[58] Field of Search ............... 251/235; 4/200, 203; 137/636–636.4, 625.67, 625.68, 625.69, 625.34, 630.19

[56] References Cited
UNITED STATES PATENTS

| 2,768,388 | 10/1956 | Smith | 4/200 |
| 2,792,021 | 5/1957 | Greeley | 137/625.68 |
| 2,679,235 | 5/1954 | Van Meter | 137/625.68 |
| 1,255,389 | 2/1918 | Cornelius | 4/200 |
| 1,848,521 | 3/1932 | Fleck | 4/203 |
| 3,296,885 | 1/1967 | Peterson | 137/636.3 X |
| 3,353,192 | 11/1967 | christiansen | 251/235 X |
| 3,526,250 | 9/1970 | Miller | 137/636.3 X |

FOREIGN PATENTS OR APPLICATIONS

| 1,135,121 | 12/1956 | France | 137/625.69 |

Primary Examiner—Henry T. Klinksiek
Attorney, Agent, or Firm—Fryer, Tjensvold, Phillips & Lempio

[57] ABSTRACT

There is disclosed a control lever and linkage system for the actuation of hydraulic valves and the like that provides novel mounting means for the control levers which provide low operator effort and improved sealing of the valve system. The supporting means for the operating level provides sealing means for the valve element itself and also provides for actuation of the valve by control forces exerted at an angle to the plane of the valve and lever.

7 Claims, 3 Drawing Figures

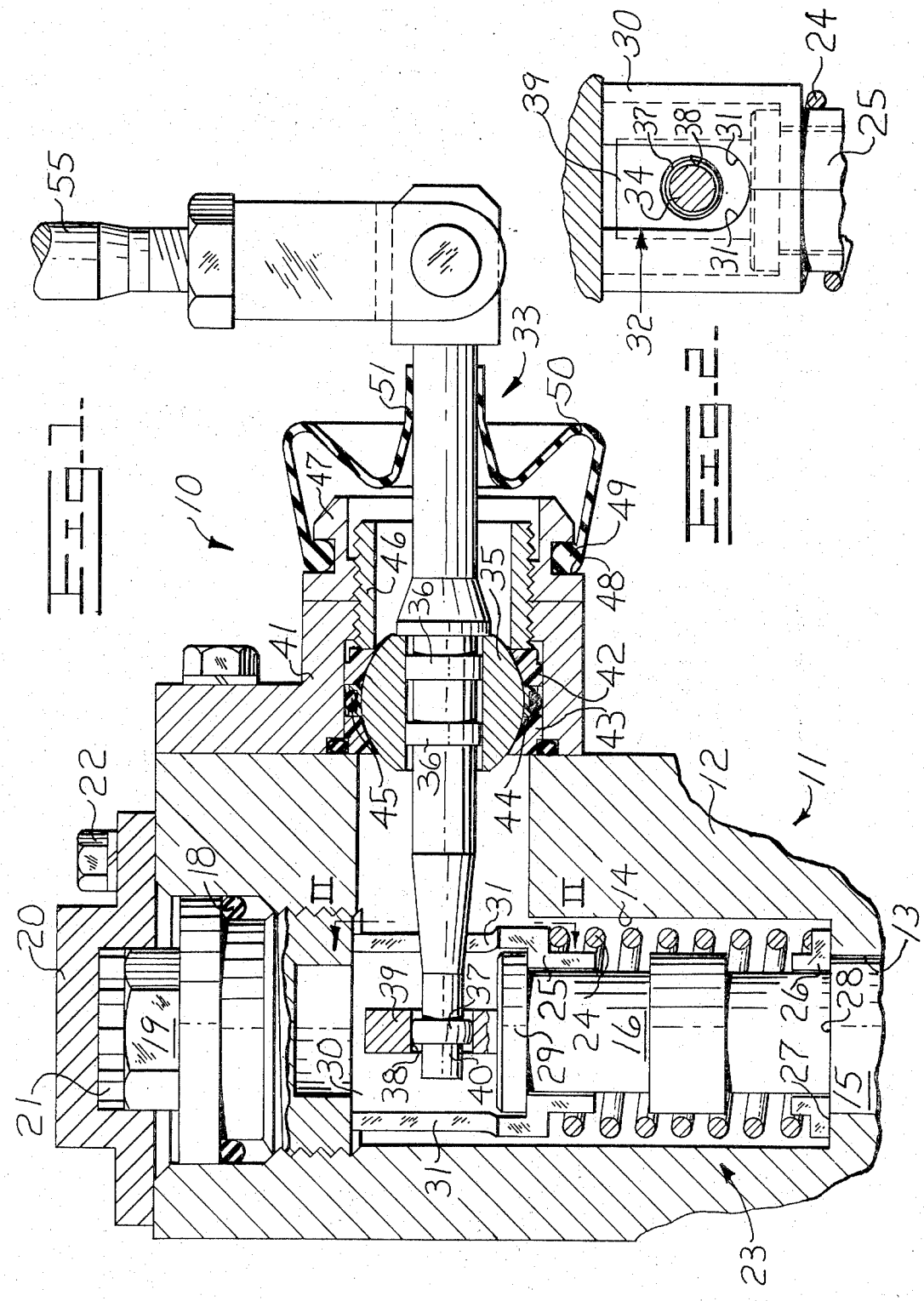

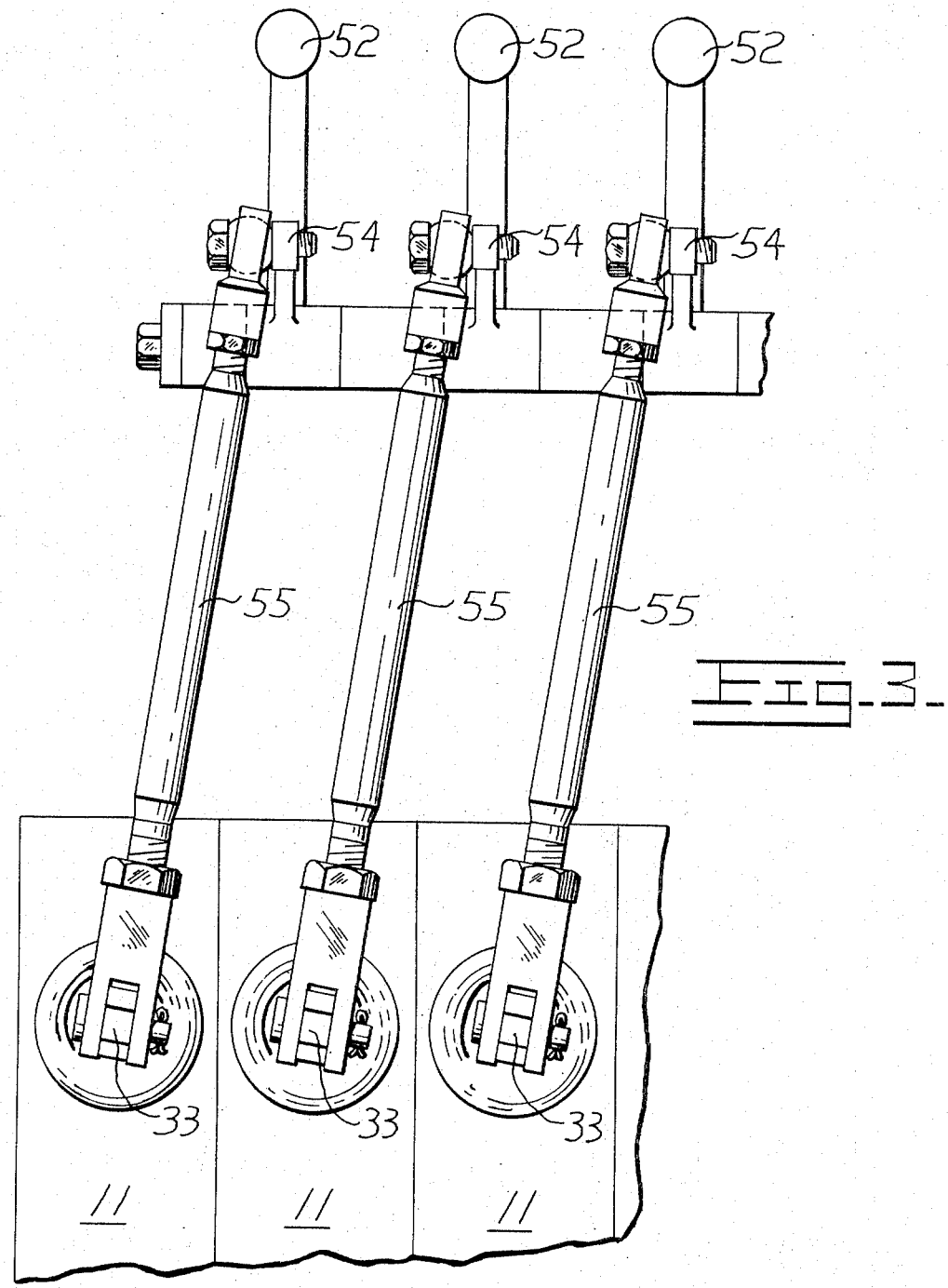

CONTROL LEVER AND MOUNTING MEANS THEREFOR

BACKGROUND OF THE INVENTION

The present invention relates to a control lever and linkage system and pertains more particularly to novel mounting means for a lever operatively connected for actuation of a hydraulic valve or the like.

Mechanical mechinery has become quite complicated in recent years and normally can be capable of performing many functions, with these functions carried out and controlled by means of hydraulic systems. Such machines normally employ a considerable number of hydraulic systems with hydraulic powered motors for carrying out the various functions. These hydraulic systems are normally controlled by a single operator at a console or control station, manipulating quite a number of valves for carrying out the many functions.

Space and ease of operation of the controls are very important in order to insure that the operator has effective control over the machine and to insure that he does not become readily exhausted from effort required to actuate the various control levers. One example of a machine that provides this situation is the motor grader, which in many cases requires as many as 12 control valves for complete control of the machine and its various implements. Since it is necessary to locate all of the control valves in a convenient position to the operator station, wherein there is a minimum amount of space available, it is necessary that the valves occupy a very small space. For example, currently designed valve spools for control valves for this purpose occupy a space of approximately one and a half inches in width, and it is desirable that the actuator for the valve be located within this space. This situation is further complicated by the need to seal the valve spool to prevent external leakage, and that the spool must be balanced to prevent surge from back pressure in the return line to avoid kick-back in the operator's control lever. It is also desirable that the sealing be accomplished with a minimum amount of drag or frictional force on the valve spool.

Rotary actuators of the type mounted on a shaft are generally not suitable for such systems because they require additional space in order to be sealed. The application of a seal directly to the spool itself increases drag on the spool and results in the requirement of an increased actuating force.

In such vehicles, the location of the operator's compartment and control levers requires that half the valves be mounted on one side of the motor grader frame, with the other half mounted on the opposite side of the frame. Since the operator's control levers are mounted at the center of the vehicle, this results in the links connecting the control lever and actuating lever being disposed at an angle to the plane of the valve member. In order to maintain simplicity in the actuating linkage train, it is necessary that the valve actuating lever be able to accept this angularity of input force.

SUMMARY OF THE INVENTION

It is the primary object of the present invention to provide a control lever and linkage system for actuation of a spool valve that is compact, simple to construct, and easy to operate.

A further object of the present invention is to provide a control leverage system for a hydraulic valve spool that is mounted to provide low operator effort and to facilitate sealing of the valve spool with the lever mounting means.

It is a further object of the present invention to provide a valve control and linkage system having simple adjustable centering means and sealing means that provide low operator effort.

In accordance with the primary aspect of the present invention, a control lever for a hydraulic valve spool is mounted on the valve housing, and extends into the valve bore for connection to the valve member. The control lever is provided with a universal mounting means that permits low frictional drag on the control lever and permits effective sealing of the valve spool to be accomplished by sealing around the control lever.

BRIEF DESCRIPTION OF THE DRAWINGS

The aforementioned objects and advantages of the present invention will become apparent from the following specification when read in conjunction with the accompanying drawings, wherein:

FIG. 1 is a sectional view of a control lever for a valve in accordance with the present invention;

FIG. 2 is a sectional view, taken generally along the lines II—II of FIG. 1;

FIG. 3 is a schematic layout of a control lever and linkage system embodying the present invention.

DETAILED DESCRIPTION OF PREFERRED EMBODIMENT

Referring now to the drawings, a control lever mechanism embodying the principles of the present invention is generally indicated by the reference numeral 10, and is illustrated as operatively connected for operation of a fluid control valve generally designated by the reference numeral 11. Valve 11 comprises a body 12 having a valve bore 13 and a spring retainer bore 14. A valve spool 15 is reciprocally mounted in bore 13 and is provided an outer movement limiting and centering portion 16. The outer end of the bore 14 is closed by a threaded plug 17 which is sealed by an O-ring 18. The plug 17 also functions as adjusting means for centering the spool, and includes a hexagonal head 19 so that once adjusted to the desired position, a cap 20 having a 12 point socket 21 is engaged with the hex 19 and secured to body 12 by a capscrew 22.

The centering mechanism generally indicated at 23 is operatively connected with the centering portion 16 of spool 15, and includes a spring 24 and a pair of split spring retainers 25 and 26. The spring retainer 26 engages a shoulder 27 defining the juncture of bores 13 and 14, and also engages the shoulder 28 on the spool 15 when the spool is in a centered neutral position. The spring retainer 25 engages an enlarged head 29 on the portion 16 of spool 15 and includes an axially extending portion 30 which normally abuts the inner end of plug 17.

As best shown in FIG. 2, the portions 30 of retainer 25 are relieved at 31 so that when the retainer is assembled, a slot 32 is provided to receive the lower end of a control or actuating lever 33.

With this arrangement, after the centering spring and retainers are assembled on the spool and inserted into valve body 12, the plug 17 is then adjusted to eliminate end play of the spool 15, and is then locked in that position by the cap 20.

The spool actuating lever 33 includes a stem portion 34 having a spherical bushing 35 press fitted on a pair of lands 36 intermediate the inner and outer ends of the lever. A spherical bearing member 37 is mounted adjacent the lower end of stem 34 for engagement with a cylindrical bore 38 provided in an actuating tang 39 of spool 15. An extension 40 at the lower end of lever 32 prevents disengagement of the lever due to turning of the spool 15.

The spherical bushing 35 is pivotally mounted in an actuator support housing 41 by a pair of conical bearings including identical upper and lower halves 42 and 43. These bearings are preferably constructed of a suitable plastic material such as a phenolic resin laminate sold under the trademark of Synthane. The bearings 42 and 43 are disposed in vertically spaced relation, with an annular U-shaped cross-section Teflon seal ring 44 disposed therebetween. The seal, preferably constructed of a suitable flurocarbon plastic or resin such as sold under the trademark Teflon, is biased into sealing engagement with the outer surface of spherical bushing 35 by an O-ring 45.

After the bearings and spherical bushing are installed in housing 41, an adjusting screw or sleeve 46 is set so that the bearings 42 and 43 lightly contact the surface of bushing 35 to eliminate end play in the actuator lever 33. A jam nut 47 is then threaded over the adjusting screw 46 to lock the assembly in place. An annular groove 48 is provided in the outer periphery of jam nut 47 and receives the lower mounting end 49 of a boot 50, which has its upper end 51 disposed in snug fitting relation to the upper portion of the actuator lever 33. The boot 50 prevents the entry of dirt, water, or other foreign material to the bearing area.

Referring to FIG. 3, there is illustrated a control arrangement comprising a plurality of control levers 52 which are pivotally supported on a shaft 53, and each including a bellcrank portion 54 pivotally connected by means of a plurality of links 55 to the actuator levers 33 of valves 11. The location of the valves 11 on the motor grader requires that half the valves be mounted on one side of the vehicle main frame, with the other half of the valves mounted on the opposite side of the frame. Since the levers are grouped centrally of the vehicle directly in front of the operator, the links 55 are disposed in angular relation to the center line of the control valve spools. As a result, when the operator moves one of the levers 52, the force input to the spool 15 of valve 11 is not in direct line therewith. The specific mounting of the lever 33 for exceptionally low effort movement in combination with the spherical bearing 37 which engages the spool 15, permits acceptance of this angularity with a reasonable side load on the valve spool to minimize actuation forces under these less than optimum conditions in the linkage.

From the above description it is seen that there is disclosed a novel control lever and linkage system for operation of a hydraulic control valve with novel mounting and sealing means to provide a compact arrangement with effective sealing and low force actuating requirements. The arrangement provides an actuating lever mounted and extending into the valve bore for actuation of the valve. Sealing and mounting means are combined for the lever, and include a spherical pivotal bearing means and sealing means cooperating therewith.

While the present invention has been disclosed by means of a single embodiment, it is to be understood that numerous changes and modifications are possible without departing from the spirit and scope of the present invention as defined in the appended claims.

What is claimed is:

1. The control lever system of claim 3 comprising:
A control lever system for a slidable valve spool comprising:
   a housing;
   a cylindrical bore formed in said housing;
   a valve spool reciprocally mounted in said bore;
   a first control lever pivotally mounted in said housing, and connected to one end of said spool for actuation thereof;
   universal pivot means for pivotally mounting said lever in said housing;
   said pivot means comprises a spherical member secured to said lever;
   bearing means including a pair of ring members having inner conical surfaces engaging said sphere and supported in said housing means and receiving said spherical member so that actuation of said valve may be accomplished by applying a force to said lever at an angle to the axis of said valve member;

a second lever offset to one side of the axis of said valve bore and pivotally mounted for movement about an axis extending substantially at right angles to said bore axis; and
   a link member operatively connecting said levers for simultaneous movement thereof.

2. The control lever system of claim 1 comprising adjustable centering means for said valve spool.

3. The control lever system of claim 2 wherein said adjustable centering means comprises a plug threadably engaging the walls of said bore; and
   annular means resiliently mounted on the end of said spool which said first lever is connected and engaging said plug.

4. The control lever of claim 3 comprising means including a cap covering the end of said bore and engaging said plug to lock said plug in place.

5. The control lever system of claim 3 wherein said control lever extends through said annular means.

6. The control lever system of claim 1 comprising centering means for said valve spool;
   said centering means comprising a plug adjustably engaging said bore, and annular extension means resiliently mounted on said valve spool for engagement with said plug.

7. The control lever system of claim 6 comprising means to lock said plug in place in said bore.

* * * * *

FO-1050
(5/69)

UNITED STATES PATENT OFFICE
CERTIFICATE OF CORRECTION

Patent No. 3,804,367          Dated April 16, 1974

Inventor(s) Howard L. Johnson

It is certified that error appears in the above-identified patent and that said Letters Patent are hereby corrected as shown below:

Line 1 of claim 1 is deleted.

Signed and sealed this 29th day of April 1975.

(SEAL)
Attest:

RUTH C. MASON
Attesting Officer

C. MARSHALL DANN
Commissioner of Patents
and Trademarks